(12) United States Patent
Yamamoto et al.

(10) Patent No.: US 11,850,945 B2
(45) Date of Patent: Dec. 26, 2023

(54) POWER SUPPLY DEVICE FOR ELECTRIC WORK VEHICLE

(71) Applicant: Kubota Corporation, Osaka (JP)

(72) Inventors: Takumi Yamamoto, Sakai (JP); Tomohiko Hisakuni, Sakai (JP); Masahiro Yamada, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/840,834

(22) Filed: Jun. 15, 2022

(65) Prior Publication Data

US 2023/0090301 A1    Mar. 23, 2023

(30) Foreign Application Priority Data

Sep. 17, 2021    (JP) .................................. 2021-152495

(51) Int. Cl.
| | |
|---|---|
| *B60L 1/00* | (2006.01) |
| *B60L 53/00* | (2019.01) |
| *B60L 50/60* | (2019.01) |
| *H02J 7/00* | (2006.01) |

(52) U.S. Cl.
CPC ................ *B60L 1/00* (2013.01); *B60L 50/60* (2019.02); *B60L 53/00* (2019.02); *H02J 7/007* (2013.01); *H02J 7/00045* (2020.01); *H02J 7/0063* (2013.01); *H02J 7/0068* (2013.01);
(Continued)

(58) Field of Classification Search
CPC .. B60L 1/00; B60L 53/00; B60L 50/60; B60L 2200/40; B60L 2210/40; H02J 7/00045; H02J 7/0063; H02J 2207/20
See application file for complete search history.

(56) References Cited

U.S. PATENT DOCUMENTS

| | | | |
|---|---|---|---|
| 2014/0035512 A1 | 2/2014 | Kamachi | |
| 2015/0112522 A1* | 4/2015 | Liang ................... | B60W 10/08 |
| | | | 180/65.265 |

(Continued)

FOREIGN PATENT DOCUMENTS

| | | |
|---|---|---|
| DE | 102015201151 A1 | 8/2015 |
| DE | 102021102148 A1 | 8/2021 |

(Continued)

*Primary Examiner* — Jared Fureman
*Assistant Examiner* — Duc M Pham
(74) *Attorney, Agent, or Firm* — The Webb Law Firm

(57) ABSTRACT

A power supply device for an electric work vehicle, including: a battery by which an electric work vehicle is drivable; a first connection unit for an internal inverter configured to convert DC power from the battery into AC power, and output the AC power to an internal electric device installed in the electric work vehicle; a second connection unit for an external inverter configured to convert DC power from the battery into AC power, and output the AC power to an external electric device; and a battery control unit connected to the first connection unit and the second connection unit, and configured to control charging of, and power supply from, the battery, wherein the battery control unit is configured to communicate with the external inverter side via the second connection unit to perform authentication regarding whether or not power supply to the external inverter is permitted.

5 Claims, 6 Drawing Sheets

(52) U.S. Cl.
CPC ....... *B60L 2200/40* (2013.01); *B60L 2210/40* (2013.01); *H02J 2207/20* (2020.01)

(56) References Cited

U.S. PATENT DOCUMENTS

| | | | |
|---|---|---|---|
| 2015/0217656 A1* | 8/2015 | Loftus | B60L 55/00 320/136 |
| 2021/0101462 A1* | 4/2021 | Ito | A01D 34/78 |
| 2021/0237612 A1 | 8/2021 | Blaser et al. | |

FOREIGN PATENT DOCUMENTS

| | | |
|---|---|---|
| EP | 3805039 A1 | 4/2021 |
| JP | 2011153962 A | 8/2011 |
| JP | 201430283 A | 2/2014 |

* cited by examiner

POWER SUPPLY DEVICE FOR ELECTRIC WORK VEHICLE

CROSS REFERENCE TO RELATED APPLICATION

The application claims priority to Japanese Patent Application No. 2021-152495, filed Sep. 17, 2022, the disclosure of which is hereby incorporated by reference in its entirety.

BACKGROUND OF THE INVENTION

1. Field of the Invention

The present invention relates to a power supply device that is to be installed in an electric work vehicle that is driven by power supplied from a battery.

2. Description of the Related Art

JP 2011-153962A (Patent Document 1) discloses a tractor to which a work machine driven by an electric actuator is to be attached. A harness of the working machine is connected to a connection unit of an external power supply harness extending from a battery, and thus electric power is supplied to the electric actuator from a battery of the tractor. Only DC power from the battery is supplied to the connection unit of the external power supply harness, and in order to drive an external electric device that requires AC power, an inverter that converts DC power to AC power is required.

JP 2014-030283A (Patent Document 2) discloses a power supply device that, in an electromotive vehicle such as an electric vehicle or a hybrid vehicle, converts the DC power of a high-voltage drive battery into AC power, and supplies electric power to an external electric device via an accessory outlet installed in the vehicle. This power supply device further includes an external outlet with a relay exposed to the outside of the vehicle and a control means, and when a power cable of an external electric device is connected to the outlet outside the vehicle, the control means detects the connection therebetween and turns on the relay to supply AC power to the external electric device.

PATENT DOCUMENTS

Patent Document 1: JP 2011-153962A
Patent Document 2: JP 2014-030283A

In the tractor according to Patent Document 1, only DC power from a battery is supplied to the connection unit of the external power supply harness, and in order to drive an external electric device that requires AC power, an inverter that converts DC power to AC power is required. In this regard, if a high-output inverter or a non-standard inverter is connected, the battery or the external power supply harness may be damaged. In addition, work vehicles such as tractors are often left outside, and in such situations, there is a problem in which electricity may be stolen through the connection unit of the external power supply harness.

In the case of the power supply device according to Patent Document 2 for supplying power to an external device, AC power is directly taken out from an external outlet connected to an output unit of the inverter, and therefore the AC-driven external electric device can be driven when connected to the external outlet. However, the inverter for driving the external electric device is installed in the vehicle, and therefore it is difficult to remove the inverter when the external electric device is no longer required, or select an appropriate inverter depending on the external electric device.

In view of the above-described circumstances, an object of the present invention is to provide a power supply device for an electric work vehicle, which allows an external inverter to be removed therefrom when it is not needed, and prevents improper/unauthorized? connection of the external inverter.

SUMMARY OF THE INVENTION

A power supply device for electric work vehicle according to the present invention includes: a battery by which the electric work vehicle is drivable; a first connection unit for an internal inverter configured to convert DC power from the battery into AC power, and output the AC power to an internal electric device installed in the electric work vehicle; a second connection unit for an external inverter configured to convert DC power from the battery into AC power, and output the AC power to an external electric device; and a battery control unit connected to the first connection unit and the second connection unit, and configured to control charging of, and power supply from, the battery. The battery control unit is configured to communicate with the external inverter side via the second connection unit to perform authentication regarding whether or not power supply to the external inverter is permitted.

According to this configuration, in addition to the first connection unit for the internal inverter that outputs power to an internal electric device (for example, a travel motor and a work motor), a second connection portion for an external inverter is provided. In response to the external inverter being connected to the second connection unit, the external inverter coverts DC power from the battery, to be supplied to the second connection unit, into AC power, and outputs the AC power to an external electric device. At this time, the battery control unit communicates with the external inverter side via the second connection unit to perform authentication regarding whether or not power supply to the external inverter is permitted. Therefore, it is possible to prevent DC power from the battery from being supplied to an inappropriate external inverter. Furthermore, with this configuration, the external inverter can be removed from the electric work vehicle when the external inverter is no longer required. Alternatively, the external inverter can be permanently installed at any location in the electric work vehicle.

In one preferable embodiment of the present invention, in response to the external inverter being connected to the second connection unit and power supply permission being output from a control system of the electric work vehicle, the battery control unit supplies the DC power to the external inverter. With this configuration, even if the external inverter connected to the second connection unit is determined as an external inverter that is authorized to be supplied with power, the external inverter is not supplied with power from the battery unless power supply permission is provided from the control system of the electric work vehicle. As a result, power supply can be stopped in a situation where power supplied from the battery to the external inverter is inappropriate, such as when an internal electric device is driven with a high load or when the battery capacity is insufficient. It is possible to employ a configuration with which power supply permission from the control system can be output in response to the driver operating a specific operation tool.

In one preferable embodiment of the present invention, in response to the external inverter being connected to the second connection unit, the battery control unit determines whether or not power supply to the external inverter is permitted, based on an identification code or specification data regarding the external inverter acquired from the external inverter.

In one preferable embodiment of the present invention, the battery, the battery control unit, the first connection unit, and the second connection unit are built into a battery device that is removably installed in a vehicle body of the electric work vehicle. With this configuration, the battery device including the battery can be removed from the vehicle body of the electric work vehicle, and taken out of the vehicle. If the external inverter is attached to the battery device in the state of being connected to the second connection unit, the battery device, together with the external inverter, can be moved to a place where an external power source is required, especially in a narrow place where the electric work vehicle cannot enter. Such a configuration is desirable when a power source is urgently needed, such as in the event of a disaster. Such a configuration is also desirable for a power source for outdoor camping.

In order to make it easier to take out a battery device when the battery device including a battery is heavy, in one preferable embodiment of the present invention, the battery device is provided with the external inverter and a transport wheel. In this regard, if the external inverter is also attached to the battery device, even a combination of a large and heavy battery and the external inverter can be smoothly moved to a place where an external power supply is needed.

In one preferable embodiment of the present invention, the second connection unit is connectable to a charging device configured to supply charging power to the battery.

DETAILED DESCRIPTION OF PREFERRED EMBODIMENTS

In the present specification, "front" means a forward direction in a front-rear direction (a travel direction) with respect to the vehicle body, and "rear" means a rearward direction in the front-rear direction (the travel direction) with respect to the vehicle body, unless otherwise specified. A left-right direction or a lateral direction means a lateral vehicle body direction (a vehicle body width direction) orthogonal to the front-rear direction with respect to the vehicle body. "Top" and "bottom" indicate a positional relationship in a vertical direction (a perpendicular direction) with respect to the vehicle body, and indicate a relationship in terms of the height from the ground.

Figure 1:
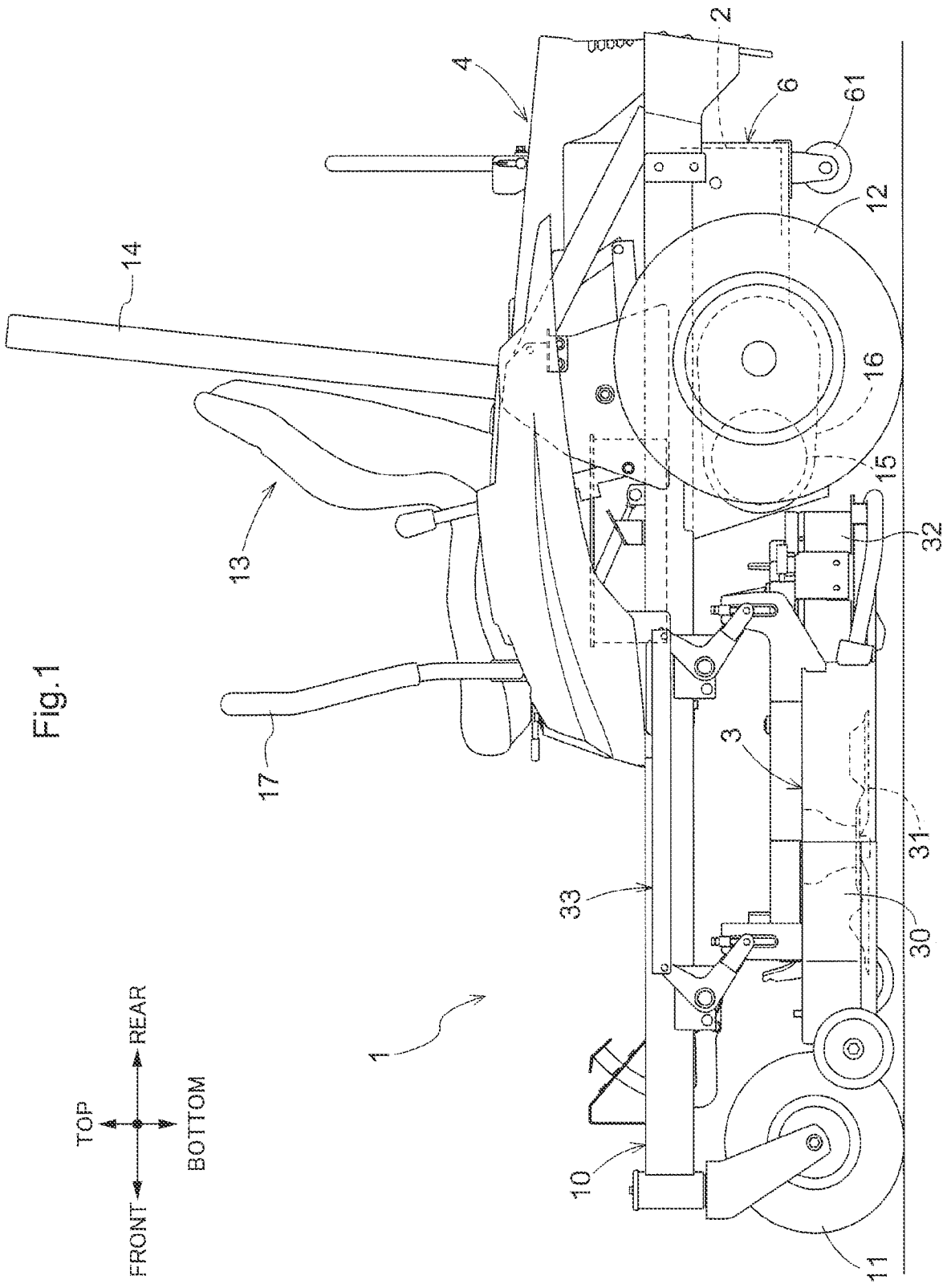
FIG. 1 is an overall side view of an electric mower, which is an example of an electric work vehicle.
Figure 2:
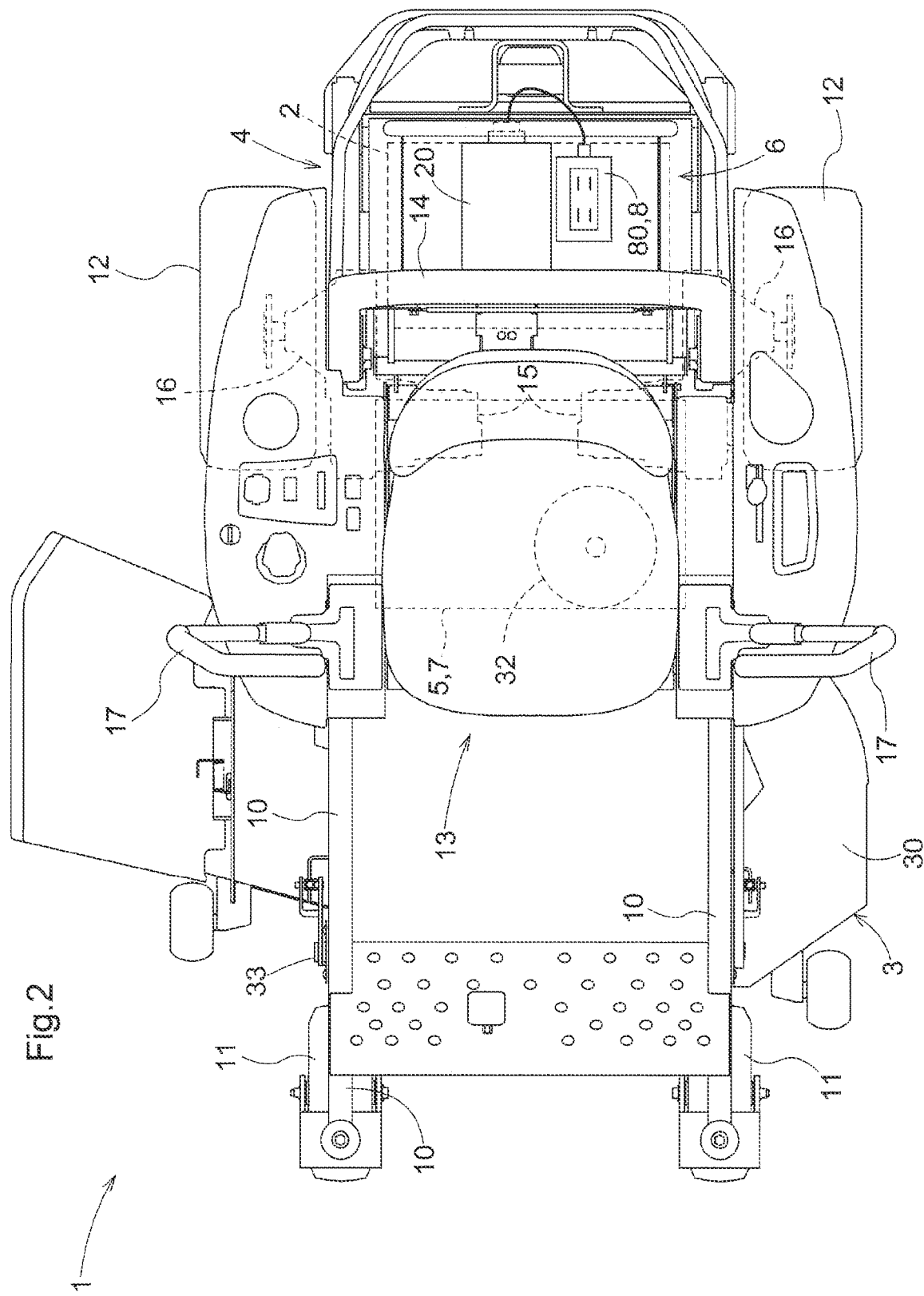
FIG. 2 is an overall plan view of the electric mower.

Next, one embodiment of the electric work vehicle according to the present invention will be described. In this embodiment, the electric work vehicle is an electric mower. As shown in FIGS. 1 and 2, the electric mower includes: a pair of left and right front wheels 11 supported by a front portion of a vehicle body 1; a pair of left and right rear wheels 12 supported by a rear portion of the vehicle body 1; and a mower unit 3 supported between the front wheels 11 and the rear wheels 12 in a lower portion of the vehicle body 1. A battery housing section 4 for housing a battery device 6 is provided between the left and right rear wheels 12. Furthermore, the vehicle body 1 is provided with a driver's seat 13, a ROPS frame 14, and so on.

The vehicle body 1 includes a frame 10 that is constituted by right and left longitudinal beams extending in the front-rear direction, and a cross beam connecting the longitudinal beams. The lower end of the ROPS frame 14 is coupled to the frame 10.

The front wheels 11 are caster type wheels, and the rear wheels 12 are drive wheels. A pair of left and right travel motors 15, which are internal electric devices, are respectively provided inward of the rear wheels 12. Power from the travel motors 15 is transmitted to the rear wheels 12 via a deceleration mechanism 16. The rear wheels 12 are driven individually.

Shift levers 17 are respectively arranged on two sides of the driver's seat 13. When the right shift lever 17 is operated to the neutral position, the right travel motor 15 is stopped. When the right shift lever 17 is operated to the forward position, the right travel motor 15 rotates forward, and when the right shift lever 17 is operated to the rearward position, the right travel motor 15 rotates rearward. Similarly, when the left shift lever 17 is operated to a neutral position, a forward position, and a rearward position, the left travel motor 15 performs the same operations as the right travel motor 15 described above. That is to say, in response to the right and left shift levers 17 being operated, the right and left rear wheels 12 are driven forward or rearward independently of each other, and the vehicle body 1 moves forward or rearward, or turns right or left.

The mower unit 3 includes a mower deck 30 and a cutting blade 31 rotatably supported inside the mower deck 30 so as to be rotatable about a vertical axis. The cutting blade 31 is rotationally driven by a cutting blade motor 32, which is an internal electric device. The mower deck 30 is suspended from the frame 10 so as to be able to move up and down, using a link mechanism 33.

Figure 3:
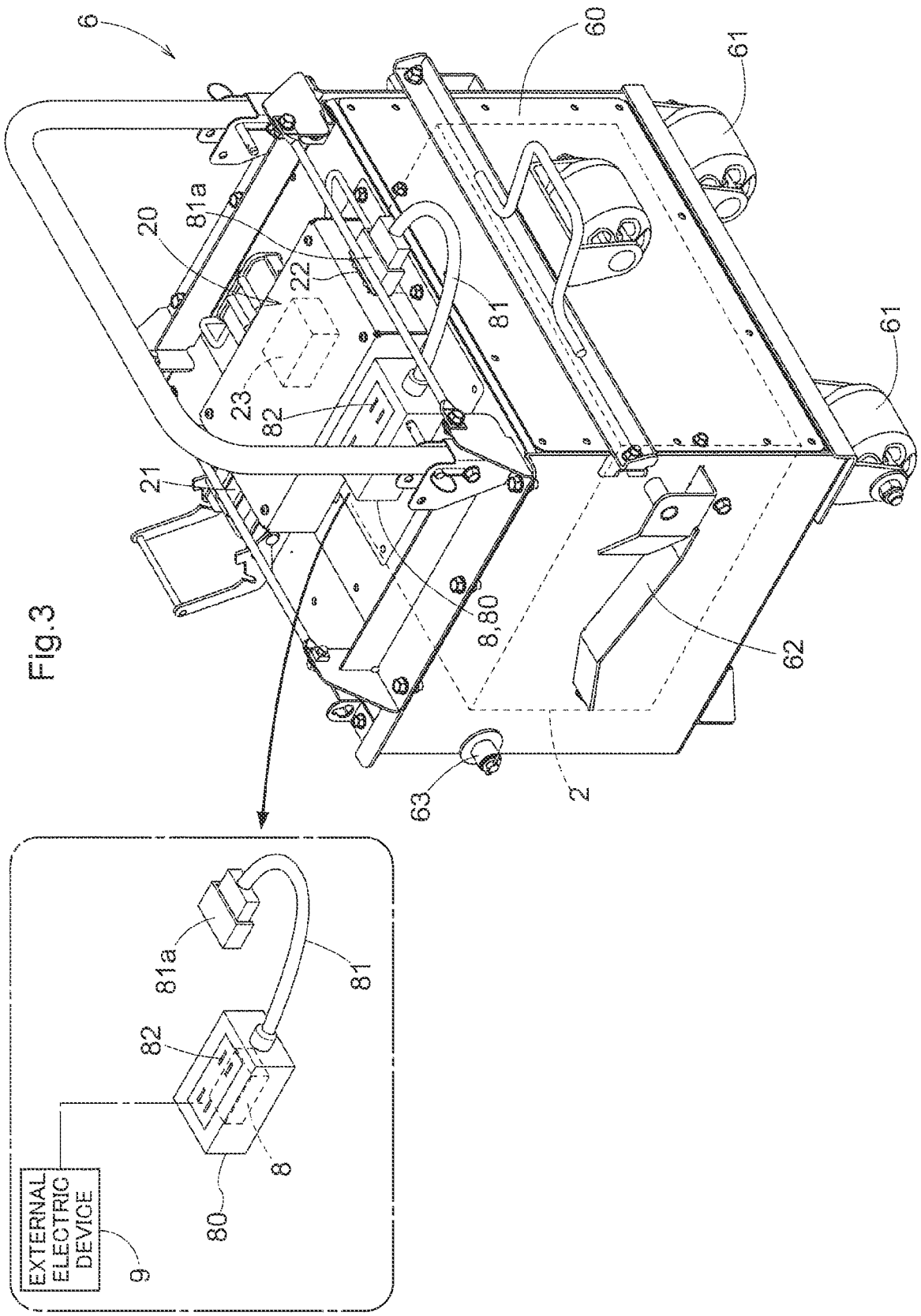
FIG. 3 is a perspective view of a battery device taken out from a vehicle body.

The battery device 6 that supplies electric power to the travel motors 15 and the cutting blade motor 32 is housed in the battery housing section 4 so as to be removable. As shown in FIG. 3, the battery device 6 is provided with a substantially cubic housing 60, and rollers 61 that serve as transport wheels are provided on the bottom surface of the housing 60. A battery 2 is built into the housing 60. A battery guide rail 62 and a battery guide roller 63 are provided on each of the left and right side surfaces of the housing 60. A power supply unit 20 for charging and power supply is provided on a central upper surface of the housing 60. An external inverter box 80 is provided next to the power supply unit 20. An external inverter 8 is housed in the external inverter box 80. The external inverter 8 converts DC power from the battery 2 into AC power, and outputs AC power. A 100 V or 200 VAC socket 82 that is connected to the external inverter 8 is provided on an outer surface of the external inverter box 80. The plug of an external electric device 9 such as a hand mower, a blower, or a chainsaw is inserted into the AC socket 82.

As shown in FIG. 2, an internal inverter 7 that converts the DC power from the battery 2 into AC power and outputs the AC power to internal electric devices such as the travel motors 15 and the cutting blade motor 32, and a control unit 5 that controls the internal inverter 7 are provided below the driver's seat 13.

Figure 5:
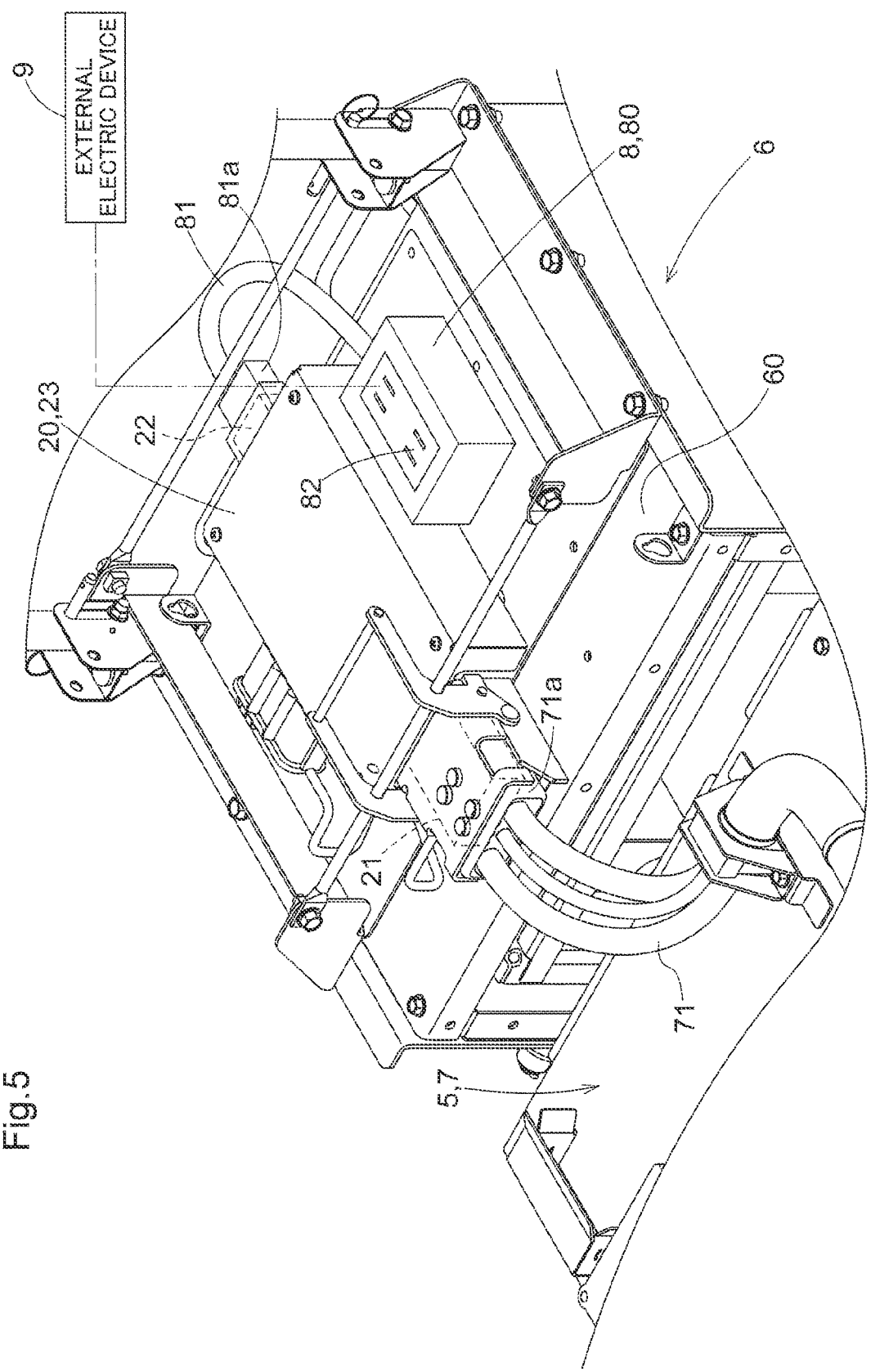
FIG. 5 is a perspective view showing a cable harness, a free connector, and a fixed connector.

Although not shown in FIG. 5, the power supply unit 20 houses a battery control unit 23. As shown in FIG. 5, a first connection unit 21 and a second connection unit 22 to which power supply lines from the battery 2 are connected are provided on side surfaces of the power supply unit 20. An internal harness 71, which is a power supply line for supplying power to the internal inverter 7, is connected to the first connection unit 21. An external harness 81, which is a power supply line for supplying power to the external inverter 8, is connected to the second connection unit 22. The battery control unit 23 has the function of controlling charging of, and power supply from, the battery 2. The battery control unit 23 is connected to the first connection unit 21 and the second connection unit 22, and controls (turns ON/OFF) the power flowing through the switching units of the first connection unit 21 and the second connection unit 22. Furthermore, the battery control unit 23 is connected to the first connection unit 21 and the second connection unit 22 via data communication lines. The battery control unit 23 can exchange data with the internal inverter 7 via the data communication line of the first connection unit 21, and can exchange data with the external inverter 8 via the data communication line of the second connection unit 22. As will be described in detail later, the battery control unit 23 can perform authentication regarding whether or not power supply to the external inverter 8 via the second connection unit 22 is permitted.

The second connection unit 22 can supply charging power to the battery 2 when connected to a power supply line of a charging device (not shown). That is to say, the second connection unit 22 is also used as a charging port for the battery 2.

Figure 4:
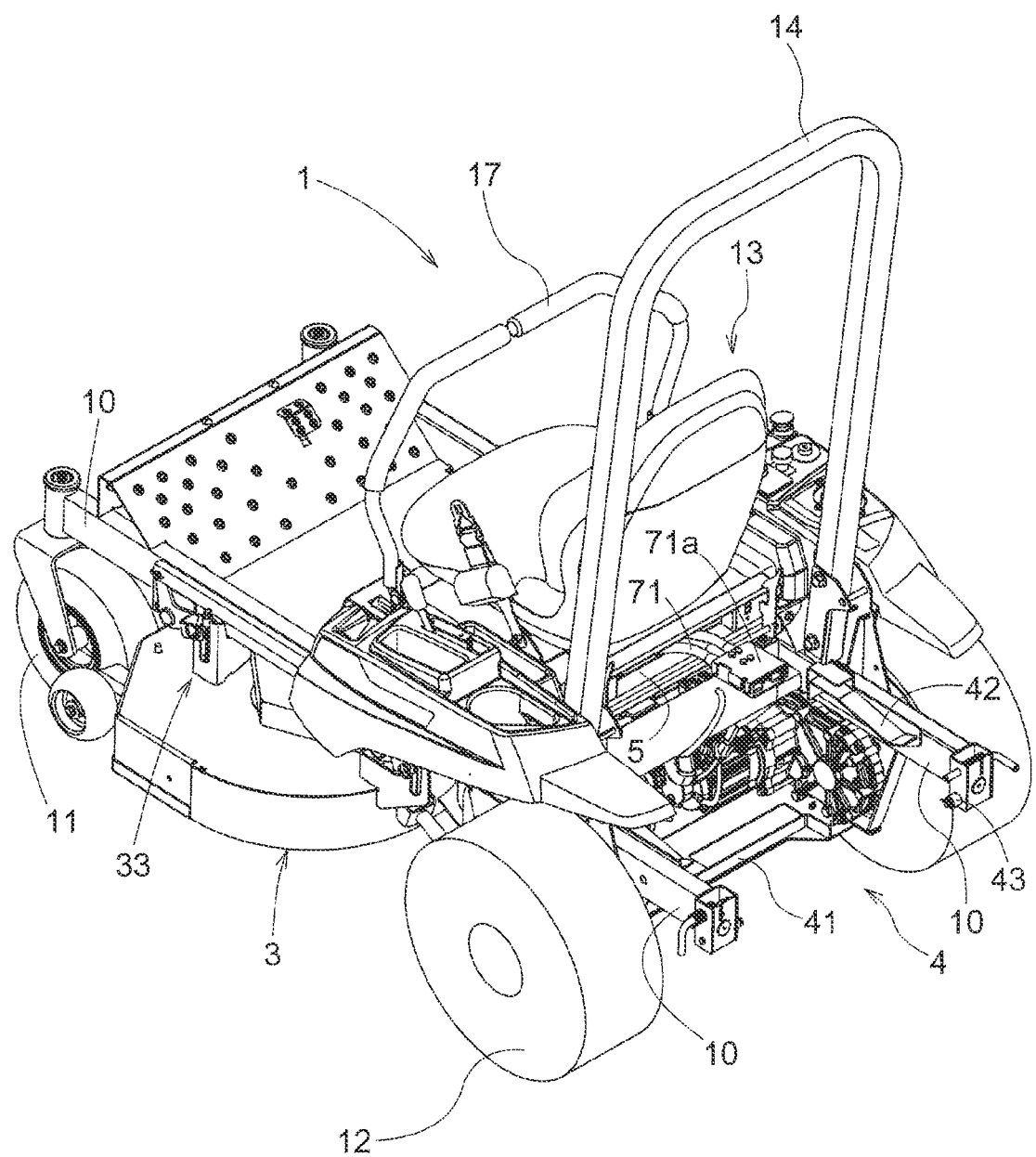
FIG. 4 is a perspective view of the electric mower, showing the vicinity of a battery housing section after the battery device has been taken out.

As shown in FIG. 4, the battery housing section 4 is formed between rear end portions of the left and right frames 10. A cross member 41 that couples the left and right frames 10 is configured to be used as a placement platform for the battery housing section 4. Furthermore, vehicle body guide rails 42 and vehicle body guide rollers 43 are respectively provided on the inner surfaces of rear end portions of the left and right frames 10. An internal harness 71 extends from the internal inverter 7 provided below the driver's seat 13, and a first connector 71a is attached to the leading end of the internal harness 71.

When the battery device 6 is loaded into the battery housing section 4, the battery guide rollers 63 are guided by the vehicle body guide rails 42, and the battery guide rails 62 abut against the vehicle body guide rollers 43. As a result, the battery device 6 smoothly moves to a housing position in the battery housing section 4.

When the external inverter 8 is not required, it is possible to disconnect the second connection unit 22 and a connector 81a from each other and store the external harness 81 together with the external inverter 8 somewhere else outside or inside the vehicle.

Figure 6:
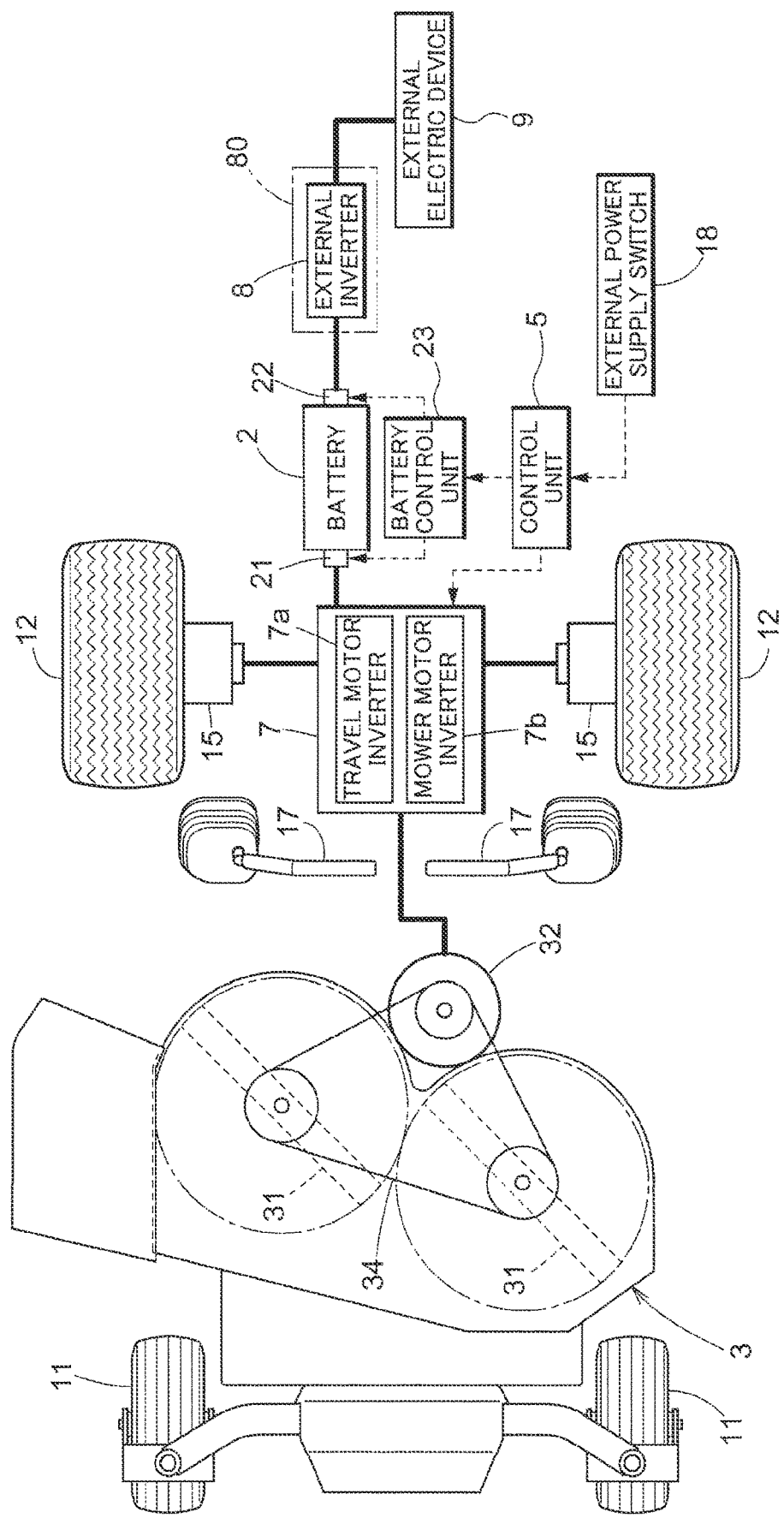
FIG. 6 is a schematic diagram showing a power system and a control system of the electric mower.

FIG. 6 schematically shows a power system and a control system of the electric mower. The internal inverter 7 includes a travel motor inverter 7a and a mower motor inverter 7b. The travel motor inverter 7a supplies electric power to each of the pair of left and right travel motors 15 individually. The mower motor inverter 7b supplies electric power to the cutting blade motor 32. The rotational force of the cutting blade motor 32 is transmitted to the cutting blade 31 via a belt transmission mechanism 34.

The control unit 5 has a calculation function, which is the function of calculating the speed of each of the pair of left and right rear wheels 12, and a control function, which is the function of controlling the internal inverter 7. The control unit 5 separately calculates the rotational speeds of the left travel motor 15 and the right travel motor 15 based on the amount of operation of the left and right shift levers 17 that function as control levers. Furthermore, the control unit 5 generates a control signal for supplying the travel motors 15 with the electric power required for realizing the rotation speeds of the travel motors 15 based on the calculation results, and provides the control signal to the travel motor inverter 7a. The travel motor inverter 7a supplies the electric power that is based on the control signal to the travel motors 15. As a result, the electric lawnmower can travel straight, turn left, and turn right.

The battery control unit 23 is connected to the first connection unit 21 and the second connection unit 22 via data communication lines, and, in particular, the battery control unit 23 can perform authentication regarding whether or not power supply to the external inverter 8 via the second connection unit 22 is permitted. Through this authentication processing, the battery control unit 23 acquires an identification code or specification data regarding the external inverter 8 from the external inverter 8 connected to the second connection unit 22, and compares the acquired identification code or specification data with the identification code or specification data of an external inverter 8 registered in advance. In the comparison, if the identification codes or the pieces of specification data match, the battery control unit 23 permits power supply to the external inverter 8 connected to the second connection unit 22. The above authentication method is an example, and whether or not power supply is permitted may be determined using IC tags or the like provided on the second connection unit 22 and the connector 81a of the external harness 81. In addition, various authentication methods may be employed.

The battery control unit 23 is also connected to the control unit 5 so that data can be exchanged therebetween. In this embodiment, an external power supply switch 18 that can be operated by the driver is connected to the control unit 5. The external power supply switch 18 is a switch used to select whether or not to permit power supply from an external device, and the control unit 5 outputs power supply permission to the battery control unit 23 based on a signal received from the external power supply switch 18. The battery control unit 23 does not supply power to the external inverter 8 via the second connection unit 22 unless power supply permission is provided. That is to say, in this embodiment, in response to the external inverter 8 being connected to the second connection unit 22, and power supply permission being output from the control system of the electric work vehicle, the battery control unit 23 supplies DC power to the external inverter 8.

OTHER EMBODIMENTS (1) In the electric work vehicle according to the above embodiment, only the battery 2 is the power source of the electric device. However, a hybrid type power source that includes an internal combustion engine and the battery 2 may be employed.

(2) In the above embodiment, the battery device 6 that houses the battery 2 can be removed from the vehicle body 1 and used. However, the battery device 6 may be fixed to the vehicle body 1 as in an electric passenger car.

(3) In the above embodiment, an electric lawnmower is described as an electric work vehicle. However, other electric work machines, electric tractors, electric harvesters, electric construction machines, and so on may also be equipped with the above-described power supply device.

It should be noted that the configuration disclosed in the above embodiments (including the other embodiments, the same applies hereinafter) can be applied in combination with the configurations disclosed in the other embodiments as long as no contradiction arises. Also, the embodiments disclosed in the present specification are examples. Embodiments of the present invention are not limited to those above, and can be appropriately modified without departing from the object of the present invention.

INDUSTRIAL APPLICABILITY

The present invention is applicable to battery-driven electric work vehicles.

REFERENCE SIGNS LIST

1: Vehicle Body
15: Travel Motor (Internal Electric Device)
18: External Power Supply Switch
2: Battery
20: Power Supply Unit
21: First Connection Unit
22: Second Connection Unit
23: Battery Control Unit
3: Mower Unit
32: Cutting Blade Motor (Internal Electric Device)
4: Battery housing section
5: Control Unit
6: Battery Device
61: Roller (Transport Wheel)
7: Internal Inverter
7a: Travel Motor Inverter
7b: Mower Motor Inverter
71: Internal Harness
71a: First Connector
8: External Inverter
80: External Inverter Box
81: External Harness
81a: Connector
82: AC Socket
9: External Electric Device

The invention claimed is:

1. An electric work vehicle comprising a power supply device, the device comprising:
a battery by which the electric work vehicle is drivable;
a first connection unit for an internal inverter configured to convert DC power from the battery into AC power and output the AC power to an internal electric device installed in the electric work vehicle;
a second connection unit for an external inverter configured to convert DC power from the battery into AC power and output the AC power to an external electric device; and
a battery control unit connected to the first connection unit and the second connection unit, and configured to control charging of, and power supply from, the battery, and
wherein the battery control unit is configured to communicate with the external inverter side via the second connection unit to perform authentication regarding whether or not power supply to the external inverter is permitted,
wherein the battery, the battery control unit, the first connection unit, and the second connection unit are built into a battery device that is removably installed in a vehicle body of the electric work vehicle, and
wherein the battery device is provided with the external inverter.

2. The electric work vehicle according to claim 1,
wherein, in response to the external inverter being connected to the second connection unit and power supply permission being output from a control system of the electric work vehicle, the battery control unit supplies the DC power to the external inverter.

3. The electric work vehicle according to claim 1,
wherein, in response to the external inverter being connected to the second connection unit, the battery control unit determines whether or not power supply to the external inverter is permitted, based on an identification code or specification data regarding the external inverter acquired from the external inverter.

4. The electric work vehicle according to claim 1,
wherein the battery device is provided with a transport wheel.

5. The electric work vehicle according to claim 1,
wherein the second connection unit is connectable to a charging device configured to supply charging power to the battery.

* * * * *